July 21, 1964 R. N. BROWN ETAL 3,141,970
DEVICE FOR MEASURING GAS PRESSURE BY MEANS OF ALPHA PARTICLES
Filed May 15, 1961
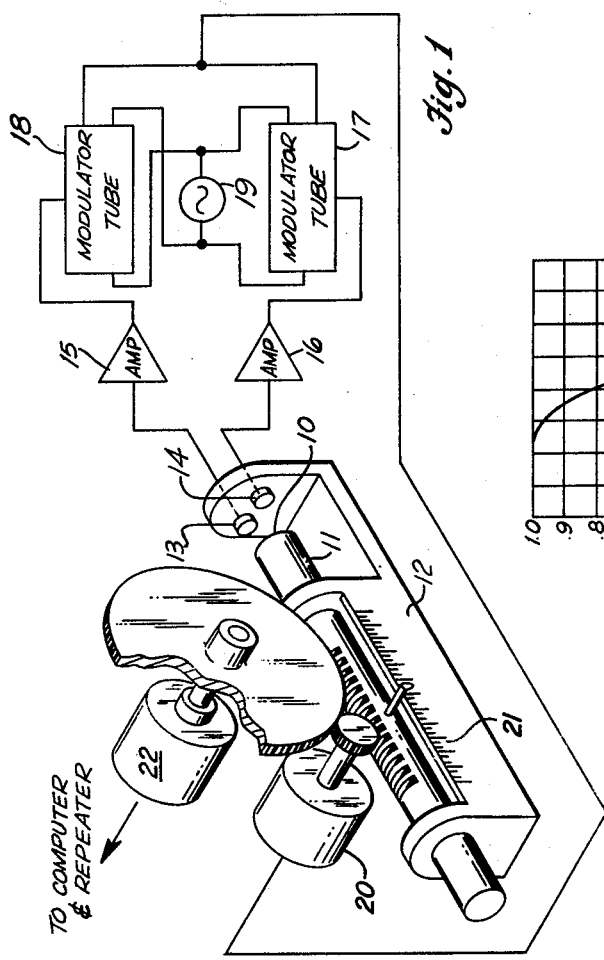
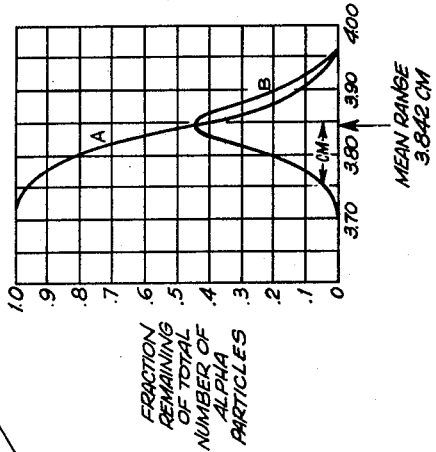
ROBERT NASH BROWN
DAVID BALBER
GREGORY VLADIMIR RYLSKY
INVENTORS
ATTORNEYS

United States Patent Office

3,141,970
Patented July 21, 1964

3,141,970
DEVICE FOR MEASURING GAS PRESSURE BY
MEANS OF ALPHA PARTICLES
Robert Nash Brown, Caldwell, David Balber, Madison, and Gregory Vladimir Rylsky, Farmingdale, N.J., assignors to General Precision Inc., Little Falls, N.J., a corporation of Delaware
Filed May 15, 1961, Ser. No. 109,971
4 Claims. (Cl. 250—43.5)

The present invention relates to a nuclear gas pressure measuring device such as an altimeter, and more particularly to the measuring of gas pressure by means of alpha particles.

The general principle on which a nuclear altimeter is based, depends upon the relationship between absolute altitude above the earth's surface and the absolute density of the atmosphere at the altitude; altitude is an inverse function of density. The relationship is not linear, with the slope or rate of change approaching zero at high altitudes. Barometric pressure follows the same general function curve when plotted against altitude.

This decrease in rate of change of pressure with respect to altitude has the effect of reducing the sensitivity of a pressure sensing altimeter as the altitude use is increased; the sensitivity of a barometric altimeter at 80,000 feet is only 5.5% of its sensitivity at 10,000 feet. Sensitivity may be defined as pounds per square inch change per thousand feet of altitude. Military specifications for a typical barometric pressure altimeter such as MIL–A–25933 allows an error, due to friction, of ±200 feet at 15,000 feet, and ±700 feet at 50,000 feet.

In a nuclear altimeter, although the measured parameter, air density is a function similar in nature to air pressure, the altimeter reacts to the inverse function of air density. The sensitivity of the nuclear device thus actually increased with increasing altitude.

The operation of a nuclear altimeter depends upon the predictability of the distance which mono energetic alpha particles from a specific source will travel in a uniform medium of known density.

The source emits the particles with only one kinetic energy resulting in a statistically fixed alpha range. This range is the result of energy transfer from particle to air molecules producing ion pairs along the alpha particle track. Since, for a given density and material, the number of molecules along each alpha particle track will be identical for a given distance, the amount of energy transferred will be constant in that distance. Thus, the resultant alpha range for every particle of the same energy should be identical.

The number of molecules per unit track length is directly proportional to the air density, making the alpha range inversely proportional to the density. Therefore, since the relationship between air density and altitude is known, a measurement of alpha range will yield altitude information.

Alpha particles have a limited range of the order of 5 cm. in air, and about 20,000 ion pairs per particle are produced. They may be stopped completely by thin solids. Much of the prior art with regard to using alpha particles for altitude measurement will be found or summarized in the Waldhauer U.S. Patent No. 2,793,341. The prior art devices, however, have only a limited use because of the nature of the alpha particles. Although the range of the alpha particle is of the order of 5 cm. in air, this is in reality only a mean range of travel. Alpha radiators such as radium and its derivatives produce alpha particles which will travel several different ranges under identical conditions. Therefore, it is necessary to differentiate among various finite ranges. Although attempts may have been made to provide an alpha particle gas pressure or density measuring device which is free of the foregoing defect and difficulties, none, as far as we are aware have ever been successful in actual practice.

It has now been discovered that an accurate alpha particle gas pressure measuring device can be provided.

Thus, the object of the present invention is to provide an accurate alpha particle gas pressure measuring device.

With the foregoing object and brief description in view, the invention resides in the novel steps, arrangements, and combinations thereof herein described, it being understood that changes in the precise embodiment of the invention herein disclosed may be made within the scope of what is described without departing from the spirit of the invention. The invention as well as other objects and advantages will become more apparent from the following description taken in conjunction with the accompanying drawing in which:

FIGURE 1 is a perspective view of the device herein contemplated.

FIGURE 2 is a graph relating to the distance traveled by alpha particles from a radiation source.

In carrying the invention into practice, an alpha particle source 10 is set at the end of movable slide 11 mounted for movement along a carriage 12. Two detectors 13 and 14 are rigidly mounted opposite said source. The distance from the source to each of said detectors is not equal, but, both distances are such that at the system null both detectors will be sensing about 100 particles per second, the system is generally calibrated to operate within the atmosphere whose density or pressure is to be measured. Output pulses from each detector are fed to an amplifier 15 and 16, and then the output from each detector through its amplifier is fed to switch means, i.e. a switch tube or transistor arrangement 17 and 18 excited by 400 c.p.s., A.-C. source 19. The tubes or transistors are so biased and arranged that the A.-C. excitation fed to each tube is equal but opposite in phase to that of the other tube. The tube connected to or associated with the detector nearest the source is designed so that it is always enabling except when it receives a pulse from its detector which pulse will cause the tube to switch out. The other tube is always out except when it receives a pulse from its detector which pulse enables the tube. The output of the switch tubes are fed to a servo motor 20 in a way that when both are enabling or both are out, the signal output is zero, i.e., when one tube is enabling and one is out, the servo motor will drive in the direction tending to reduce the signal to zero, by moving slide 12. The device thus constantly tends to drive to null. When no particles are striking either detector the source is a distance from both detectors which is beyond the range of any alpha particles. Since one tube is always out unless it receives a signal there is an input to the servo motor which in turn pushes the slide in the direction of the detectors. At a point close to the detectors both tubes will receive a signal from the source this time, the other tube will be enabling and the one tube will be out. This will produce a signal driving the servo motor in the opposite direction. Between these two extremes there is an area where only one of the tubes receives a signal. This will produce a situation where both tubes are either enabling or out and the system is at null. Since the null distance depends on the sensing of alpha particles by one detector and not the other, the distance of the source to the midpoint of the two detectors at null is always the mean range of particle distribution. Since the range of travel of the alpha particles decreases with an increase in density, the distance between the source and the midpoint of the two detectors is a measure of the density of the medium in which the particles are dispersed.

The device preferably has a scale 21 calibrated in gas density or a synchro arrangement 22 furnishing signals to computers.

Prior to launching a missile or a space vehicle, the distance between the source and the detector is accurately set to the range of alpha particles at the altitude for which an actuation signal is desired. Since no alpha particles will reach the detector at altitudes below the actuating altitude, there will be not output pulses from the detector and no signal from the electronic unit. When the actuating altitude is reached all of the alpha particles will reach the detector resulting in high value time-density pulse outputs from the detector.

For an alpha emitter, it is possible to use either polonium 210 or plutonium 239. Polonium 210 decays to stable lead and consequently, has no active sub-product to cause complex emission. Although polonium 210 emits a few gamma rays, these are weak, and amount only to one in $10^5$ alphas. However, the half life of polonium 210 is only 138 days. Therefore, polonium 210 can only be used for short term applications.

Plutonium 239 is the preferred long term alpha particle source. Its half life is $2.4 \times 10^4$ years and its emission is mono-energetic at 5.15 mev.

The following table lists the sources of alpha particles:

TABLE I

*Range and Energy of Alpha Particles*

| Element | Mean Range in cm. in Air at 15° C. | Energy in Mev. |
|---|---|---|
| Plutonium | 3.6 | 5.15 |
| Polonium | 3.842 | 5.298 |
| Radon | 4.051 | 5.486 |
| Radium A | 4.657 | 5.998 |
| Thoron | 5.004 | 6.2818 |
| Thorium A | 5.638 | 6.774 |
| Radium C | 6.907 | 7.680 |
| Do | 7.792 | 8.277 |
| Do | 9.04 | 9.066 |
| Do | 11.51 | 10.505 |
| Thorium C | 8.570 | 8.776 |
| Do | 9.724 | 9.488 |
| Do | 11.580 | 10.538 |

It is an inherent characteristic in the passage of alpha particles through matter regardless of the radiation source that they lose energy in a non-uniform manner. This brings about a characteristic straggling effect in the sharpness of their range cut-off. Instead of all alphas terminating in air at exactly the same distance from the source, there is a spread. The mean range of polonium 210 alpha particles in air at 15° C., 760 mm. Hg is 3.842 cm. The mean range for plutonium 239 at 15° C., 760 mm. Hg is 3.6 cm.

This is the distance which half of the particles exceed and of which half fall short. The extremes of the range for polonium 210 are 3.72 and 3.97 with a Gaussian distribution in between. Curve A of FIGURE 2 is a number distance plot for polonium 210 showing that all alphas are present until about 3.7 cm. There they start to drop off. Fifty percent are gone at the 3.84 mark, and all have been absorbed by 3.97 cm. Curve B shows the Gaussian distribution, wherein, about 75% of the ranges lie plus or minus 0.5 mm. from the mean range. This means that 3/4 of all alphas have a range of between 3.79 to 3.89 cm., with a fairly sharp cut-off. The mean range as shown in FIGURE II for polonium 210 is 3.842 cm. The distribution for plutonium 239 is comparable to that of polonium 210. The detectors can thus be separated a distance about 10 mm. To obtain the concentration of polonium 210 shown in FIGURE 2 at the mean range of 3.842 cm., it is preferable that the alpha source be made as a chemically plated polonium on a metal backing, usually nickel. In fact, up to about 20 millicuries per square inch is available commercially with a one micron gold cover.

Care must be taken to avoid aggregate recoil. This means that a whole cluster of polonium nuclei distintegrates simultaneously and the recoil is so great that a local group of polonium atoms are dislodged off the mounting means; gold will anchor the polonium to the backing.

A plutonium 239 particle source may be made by evaporating .004 gram of pluntonium oxide ($PuO_2$) in a centrally located area of a 4 mil thick platinum disk.

Alpha particle detectors may be of three general types. These are gas-filled ionization chambers, scintillation counters, and crystal detectors. The gas-filled ionization chamber also called a Geiger-Muller counter is fairly simple, reliable, long-lived, and has a low detection efficiency for hard radiation such as gamma rays. However, it has a relatively long resolving time (maximum count rate is approximately $10^4$ counts per second), and it requires rather careful design of the window so that it will pass alpha particles yet withstand the extremely low air pressures at high altitudes.

The scintillation counter requires a photomultiplier which is somewhat more demanding of supporting equipment but has a resolving time approximately $10^3$ times shorter than the gas filled ion chamber.

For the purposes of the present invention, it is advantageous if a halogen filled, mica window Geiger tube is used as the alpha ray detector. For this work, the tube has a 3/8" diameter and a 2 3/4" length. This Geiger tube has a temperature operating range of minus 50° C. to plus 75° C. and its life is unaffected by frequent and prolonged operation.

The mica window is 1.4 mg./cm.$^2$ thick and it will withstand an absolute pressure of zero p.s.i. The operating voltage is 700 volts, with a plateau length, at 100 counts/sec., of 100 volts minimum and a relative plateau slope of 10%/100 volts maximum.

The source and its holder are mounted on a triangular plate which is rigidly attached to the ball nut of a lead screw. The screw is mounted on bearings which are mounted in a front and rear plate held together by two tie bars and a guide shaft. Motion is imparted to the screw on which the nut rides through the pinion of a servo and a gear keyed on the forward end of the screw shaft. The Geiger tube detector is mounted in the front plate in a holder on a line perpendicular to the center of the platinum disk on which the source is evaporated.

The source is positioned near the end of the particle range, by the servo and control circuit. Air density is a function of the distance between the source and the end mica Geiger window.

Crystal detectors may be made of cadmium sufide, diamond, or germanium. These are very sensitive, light, and small. Since the servo system will be fed signals with a time constant of about 5,000 microseconds, the detector head is an instantaneous device. The pulse size will be sufficiently high so as to have a high signal to noise ratio. Since the range of the alpha particles inside the detector, e.g., inside a crystal of a density of 5 and an atomic weight of 70 is only about 3 microns there is no problem concerning the finite range within the detector, particles from the alpha source 10 will produce a pulse of some micro or millisecond duration. These pulses will in turn be combined in the switch means, e.g., transistors or tubes 17 and 18 to produce 400 c.p.s. pulses to drive the positioning servo motor 20. As shown in the drawing, the output of the two switch means 17 and 18 are added so that when both switch means are enabling or out, the input to the servo motor is substantially zero. When only one tube is enabling, the direction of the motor is determined by the phase.

In the absence of any particles striking either detector, the switch means controlled by the detector furthest from the source, i.e., detector 14 is out and the tube controlled by the detector nearest the source, i.e., 13, is enabling. This causes motor 20 to drive the source towards the detectors. As the source approaches the detectors, the alpha particles will produce 0.005 second switching pulses at some random rate. Each particle striking the one detector will cause the switch means to produce a small forward phase movement, and at the same time particles striking the other detector will produce a small rearward movement. Moving means 11 will continue in its direction of motion until the amount of pulses in the forward phase are equal to the pulses in the rearward direction phase. Looking again at FIGURE 2, it is obvious that even with variations in the radiation source, the center point or mean range at 15° C., 760 mm. Hg will remain at the 3.842 cm. position, for polonium 210 or 3.6 for plutonium 239 also, the mean particle range will vary according to the formula:

$$\frac{R_1}{R_2}=\frac{d_2}{d_1}=\frac{P_2 t_1}{P_1 t_2}$$

where $R_1$ is the mean range of the alpha particles at a pressure of $P_1$, and a temperature of $t_1$; and $R_2$ is the mean range of the alpha particles at a pressure of $P_2$ and a range of $t_2$.

From the foregoing, at 50,000 feet, for example, the air density is about one-sixth that at sea level and the alpha range will be six times that at zero altitude. The scale 21 of FIGURE 1 can thus be calibrated to read altitude.

The sensitivity of the device will best be understood by reference to the following table:

TABLE II

| Altitude in feet | Density in mg./cc. | Sensitivity to Changes | |
| --- | --- | --- | --- |
| | | In altitude feet | Density, mg./cc. |
| 0 | 1.226 | 50 | $2 \times 10^{-3}$ |
| 1,000 | 1.226 | 50 | $2 \times 10^{-2}$ |
| 5,000 | 1.204 | 30 | $1 \times 10^{-2}$ |
| 10,000 | .904 | 25 | $8 \times 10^{-4}$ |
| 15,000 | .771 | 20 | $6 \times 10^{-4}$ |
| 20,000 | .653 | 11 | $3 \times 10^{-4}$ |
| 30,000 | .458 | 11 | $2 \times 10^{-4}$ |
| 40,000 | .300 | 7 | $1 \times 10^{-4}$ |
| 50,000 | .186 | 4 | $3 \times 10^{-5}$ |

For special application where sensitivity at sea level is not a prime requisite a 1.7 mg. per cm.² absorber can be used to permit shortening of the unit so that instead of using a range of 16 cm. at a density equivalent of 50,000 foot of altitude, as with no absorber, the range would be only 8 cm., but the device would have only half the sensitivity at each altitude and equivalent density as given in the table above. Therefore, the device would be sensitive to a 50 foot change in altitude at 10,000 feet instead of sea level.

It is to be observed therefore that the present invention provides for a gas pressure measuring device and comprises in combination, an alpha particle source 10 emitting particles in the gas whose pressure is to be measured, preferably of plutonium 239 or polonium 210 on a metal backing, e.g., gold, nickel or platinum backing, said source being mounted for longitudinal movement along a carriage 12, two detectors 13 and 14 one detector being set closer to said source than the other, the detectors being preferably separated by a distance of the order of about 10 mm., switch means e.g., transistors or tubes 17 and 18 associated with each detector, one switch being always in the enabling position unless the detector is sensing alpha particles, the other switch always being out unless the detector senses alpha particles; A.-C. excitation means supplying an output across each switch means when enabling, equal in amplitude but opposed in phase to that of the other detector; servo means 21 fed in phase to that of the other detector; servo means 21 fed by the combined output from said switch means.

It will be aparent to those skilled in the art, that our present invention is not limited to the specific details described above and shown in the drawings, and that various modifications are possible in carrying out the features of the invention and the operation and the method of support, mounting and utilization thereof, without departing from the spirit and scope of the appended claims.

We claim:

1. A gas density measuring device, comprising in combination; alpha particle source emitting particles in the gas whose density is to be measured;
   longitudinal moving means on which said source is mounted; two detectors sensitive to alpha particles, one of said detectors being set closer to said source than the other, said detectors being separated a distance of the order of about ten millimeters;
   switch means associated with each detector, one switch being always in the enabling position unless the detector is sensing alpha particles, the other switch always being out unless the detector senses alpha particles;
   A.-C. excitation means supplying an output across each switch means when enabling, equal in amplitude but opposed in phase to that of the other detector;
   servo means fed by the output from said switch means driving said longitudinal moving means in the forward direction towards the detectors or rearward away from said detectors in response to the output from the one or the other of said switch means.

2. A gas density measuring device, comprising in combination;
   a polonium 210 alpha particle source emitting particles in the gas whose density is to be measured;
   longitudinal moving means on which said source is mounted by means of a nickel backing;
   a carriage along which said moving means moves longitudinally;
   two detectors sensitive to alpha particles, one of said detectors being set closer to said source than the other; said detectors being separated a distance of the order of about 10 mm.;
   switch means associated with each detector, one switch being biased so as to be always in the enabling position unless the detector is sensing alpha particles the other switch always being biased out unless the detector senses alpha particles;
   A.-C. excitation means connected so as to supply an output across each switch means when enabling, equal in amplitude but opposed in phase to that of the other detector;
   motor servo means fed by the combined output from said switch means driving said source in the forward direction towards the detectors or rearwards away from said detectors depending on the phase output from said switch means.

3. A gas density measuring device, comprising in combination;
   a plutonium 239 alpha particle source emitting particles in the gas whose density is to be measured;
   longitudinal moving means on which said source is mounted by means of a nickel backing;
   a carriage along which said moving means moves longitudinally; two detectors sensitive to alpha particles, one of said detectors being set closer to said source than the other; said detectors being separated a distance of the order of about 10 mm.;
   switch means associated with each detector, one switch being biased so as to be always in the enabling position unless the detector is sensing alpha particles the other switch always being biased out unless the detector senses alpha particles;

A.-C. excitation means connected so as to supply an output across each switch means when enabling, equal in amplitude but opposed in phase to that of the other detector;

motor servo means fed by the combined output from said switch means driving said source in the forward direction towards the detectors or rearwards away from said detectors depending on the phase output from said switch means.

4. A gas density measuring device, comprising in combination;

a polonium 210 alpha particle source emitting particles in the gas whose density is to be measured;

longitudinal moving means on which said source is mounted by means of a nickel backing;

a carriage along which said moving means moves longitudinally;

two halogen filled, mica window Geiger tube detectors sensitive to alpha particles, one of said detectors being set closer to said source than the other; said detectors being separated a distance of the order of about 10 mm.;

switch means associated with each detector, one switch being biased so as to be always in the enabling position unless the detector is sensing alpha particles the other switch always being biased out unless the detector senses alpha particles;

A.-C. excitation means connected so as to supply an output across each switch means when enabling, equal in amplitude but opposed in phase to that of the other detector;

motor servo means fed by the combined output from said switch means driving said source in the forward direction towards the detectors or rearwards away from said detectors depending on the phase output from said switch means.

References Cited in the file of this patent

UNITED STATES PATENTS

| | | |
|---|---|---|
| 2,552,723 | Koury | May 15, 1951 |
| 2,739,478 | Offner | Mar. 27, 1956 |
| 2,908,819 | Marx | Oct. 13, 1959 |
| 2,938,118 | Martin | May 24, 1960 |
| 2,978,587 | Forro | Apr. 4, 1961 |
| 2,981,840 | Nahmias | Apr. 25, 1961 |
| 3,025,396 | Laughlin | Mar. 13, 1962 |
| 3,087,114 | Lorenz | Apr. 23, 1963 |